United States Patent
Zane

[11] Patent Number: 5,143,019
[45] Date of Patent: Sep. 1, 1992

[54] APPARATUS AND PROCESS FOR FARMING SHRIMP

[76] Inventor: Gino Zane, 235 SW. LeJeune Rd., Miami, Fla. 33134

[21] Appl. No.: 638,278

[22] Filed: Jan. 3, 1991

[51] Int. Cl.$^5$ ............................................. A01K 61/00
[52] U.S. Cl. ........................................... 119/2; 43/4; 119/3
[58] Field of Search .................... 119/2, 3, 4; 43/4, 4.5

[56] References Cited

U.S. PATENT DOCUMENTS

| | | | |
|---|---|---|---|
| Re. 30,038 | 6/1979 | Sweeney | 119/3 |
| 3,473,509 | 10/1969 | Miyamura | 119/3 |
| 3,842,804 | 10/1974 | Christensen et al. | 119/3 |
| 4,211,183 | 7/1980 | Hoult | 119/3 |
| 4,324,200 | 4/1982 | Johnson | 119/3 |

OTHER PUBLICATIONS

Curt D. Rose, Alva H. Harris & Burt Wilson, Extensive Cutture of Penaeid Shrimp in Louisiana Salt-Mark Impoundments, pp. 296-307, 1975.

Primary Examiner—Richard K. Seidel
Assistant Examiner—James Miner
Attorney, Agent, or Firm—Jesus Sanchelima

[57] ABSTRACT

An impoundment for farming shrimp located in the proximity of salt and fresh water sources defined by a retaining wall defining a substantially rectangular area with a channel adjacent to the inner side of said wall and a central portion having its bottom surface above the plane of the bottom surface of the channel. One reservoir for storing salt water is located in a location of said rectangular area in close proximity to the salt water source and it also discharges the salt water contained therein into the rectangular area. Another reservoir for storing fresh water is located in the rectangular area in close proximity to the fresh water source. Another pumping assembly is used for pumping the fresh water from the fresh water source into said second reservoir means. A barrier divides the rectangular area so that two sub-areas are defined and one of the subareas being farther away from the reservoirs includes an opening of relatively small diameter. A fishing net is positioned between the salt water reservoir and the rectangular area so that the shrimp that are attracted towards the higher salinity areas can be captured with the fishing net. Several draining tubes are positioned around the retaining wall for controlling the level and salinity of the water in the impoundment.

7 Claims, 2 Drawing Sheets

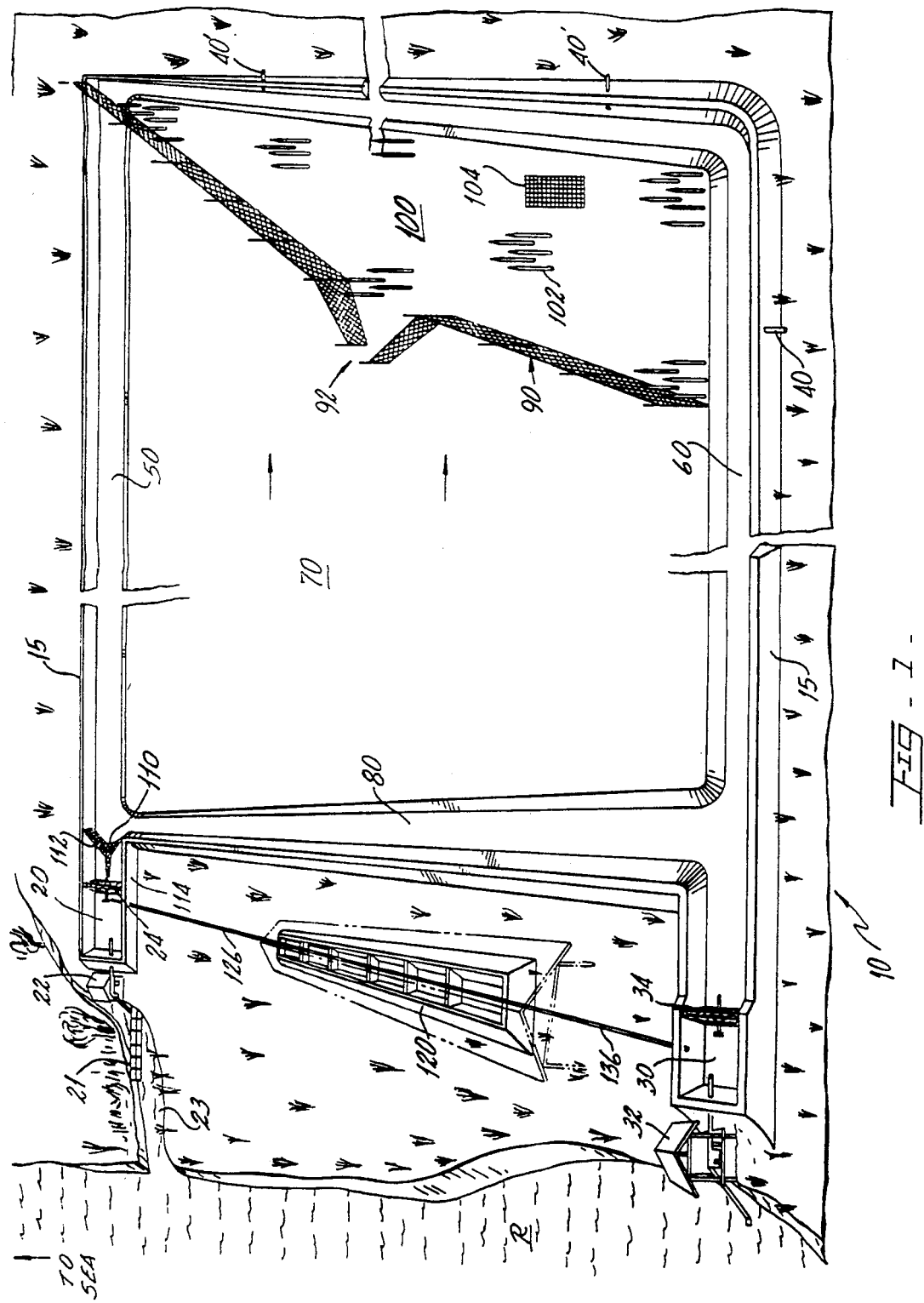

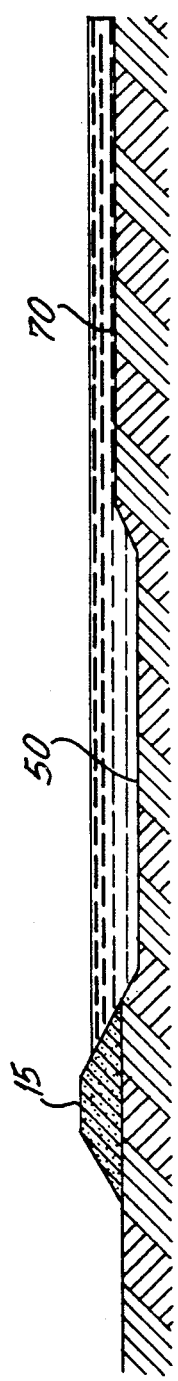
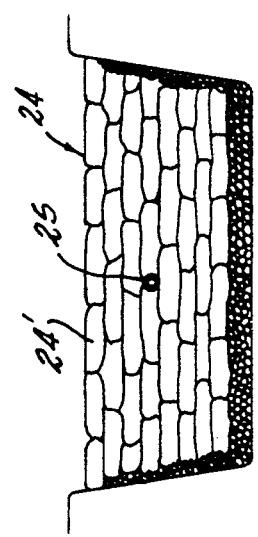
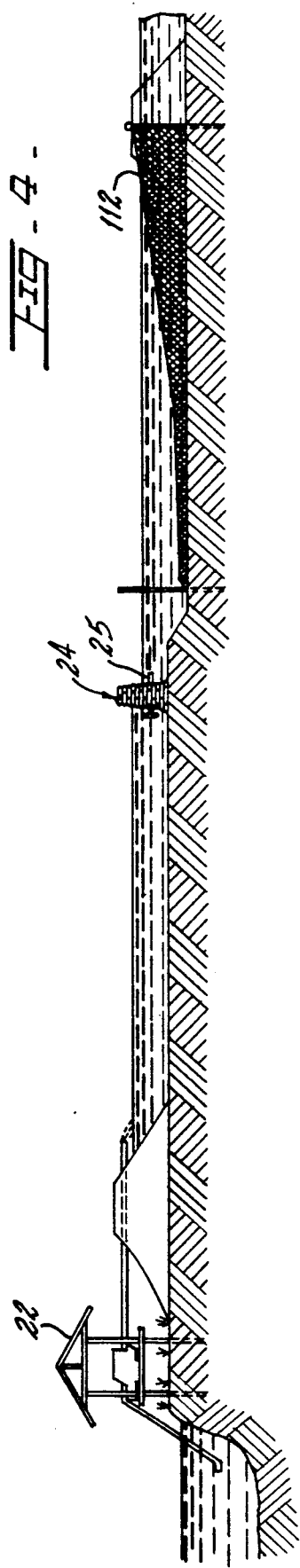

1

APPARATUS AND PROCESS FOR FARMING SHRIMP

BACKGROUND OF THE INVENTION

1. Field of the Invention

The present invention relates to an apparatus and process for the extensive cultivation of shrimp, and more particularly, to such apparatus and process that are extensive, continuous and specific in the farming of shrimp.

2. Description of the Related Art

Several efforts have been made to cope with the ever increasing demand for shrimp in the United States and other parts of the World. In particular, one of such efforts has been documented by Curt D. Rose, Alva H. Harris and Burt Wilson in the enclosed report entitled Extensive Culture of Penaeid Shrimp in Louisiana Saltmark Impoundments, published in Transactions of the American Fisheries Society, 104(2), pp 296-307, 1975. In that experiment, two impoundments received shrimp through a 13-mm mesh so that only postlarval and juvenile shrimp had access to the impoundments. As reported in that study, the major problem in extensive shrimp farming has been the heavy predation on shrimp that cannot be removed from natural impoundments. The authors discuss the possibility of migration from the impoundment as a possibility and the other possibility, poisoning, would raise ethical questions (and possibly affect the shrimp as well). Another factor reported to contribute to the mortality of the shrimp is the low salinity (or lack of control over the salinity of the impoundment) that deleteriously affect the postlarvae and older shrimp. Also, the difficulty in undergoing the nutritional transition from hatchery to impoundment foods and the levels of illumination (ultraviolet radiation) may also affect the shrimp. All these problems are under control in the present invention where the culture is not only extensive but also continuous and specific on a particular breed of shrimp.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide an extensive, continuous and specific method for farming shrimp and the apparatus thereof.

It is another object of this present invention to provide a method and apparatus that provides an impoundment with different environmentally suitable sections for the biodynamic developments of the shrimp.

It is still another object of this present invention to provide a method and apparatus that will provide such an impoundment free of any predators and where the salinity of the water is controlled.

It is still another object of this present invention to provide a method and apparatus that can provide protection against the ultraviolet and infrared radiations during the day.

It is yet another object of this present invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents a top view of the apparatus in accordance with the present invention.

FIG. 2 shows an elevational view of a portion of the apparatus shown in FIG. 1, taken along line 2—2.

FIG. 3 illustrates an elevational view of another portion of the apparatus shown in FIG. 1, taken along line 3—3.

FIG. 4 is an elevational view of a vertical biological filter.

DETAILED DESCRIPTION OF THE PREFERRED EMBODIMENT

Referring now to FIG. 1, where the preferred embodiment for the present invention is generally referred to with numeral 10.

The shrimp undergoes a period of metamorphosis that requires different environments with different physical and chemical characteristics compatible with the animal's own biological intelligence. This makes the shrimp migrate during its development. The present invention takes these matters into consideration and provides an environment that is biodynamically designed to follow this development in an efficient manner and being chronologically programmed.

As it can be seen in FIG. 1, an impoundment is made in the vicinity of the sea shoreline having substantially a rectangular shape. The dimensions may vary provided that the functions described below are achieved. At present, the experimental pilot plant in Panama has one kilometer in length and 250 meters in width. There is a retaining wall 15 that extends around the periphery of the impoundment sufficiently high to keep a body of water within its confines. A salt water reservoir 20 is located in the lowest point along the shoreline and in spaced apart relationship fresh water reservoir 30 is located preferably next to a fresh water supply such as a river R. Channel 23 is close to the sea/river interface so that on high tide salt water is retained by dam 21. Pumping assemblies 22 and 32 pump water to the respective reservoirs 20 and 30, as needed, to maintain the proper salinity level throughout the impoundment. Drain assemblies 40 and 40' are distributed throughout the impoundment. Drain assemblies 40 are positioned substantially at the surface of the water in the reservoir so that excess water from rains can be drained off. Drain assemblies 40' are positioned substantially at half distance from the surface and they are intended to regulate the water level to simulate the water movements of high and low tide. Drain assemblies 40 and 40' may be moved from one location to another as required, since wall 15 is made out of dirt. Drain assemblies 40 and 40', when open, cause a slight current inside the reservoir defined by retainer walls 15 since the shrimp typically swims against this current in this manner the hydrography of the reservoir can be regulated to affect the migrating displacement of the shrimp. Drains 40 and 40' can be readily removed and installed in other locations depending on the needs to control the water level, salinity, oxygen content, hydrography, temperature, transparency and general water distribution.

Reservoirs 20 and 30 are separated from the rest of the impoundment by biological filters 24 and 34. A representation of a biological filter 24 or 34 can be seen in FIG. 4 and they consist substantially of walls made out of filled shells and carcases of mollusk beings and also with volcanic rocks (porous). These walls are preferably covered with these animal remains so that a porous separation can be achieved and then bags of these remains are positioned above it to form the vertical portion of the biological filter. Sacs 24' are filled with these animal remains. It is also possible to sandwich these biological filters between two spaced-apart concrete walls. Directional tubular members 25 concentrates a current or stream of salt water and its higher salinity attracts the shrimp. Also, most of the water from reservoirs 20 and 30 is passed and filtered through opening 29 and 39 in concrete walls 27 and 37 and also through the porous bodies between these two walls. Fishing net 112 is positioned in close proximity to the outlet of member 25. In this manner, the shrimp is caught alive and permits a subsequent selection of the catch. Two lateral channels 50 and 60 extend longitudinally and they are separated by a marshy area in the center denominated benthonic area 70. The depth of the channels is 2.5 meters, approximately, and the depth of benthonic area 70 is 1.5 meters approximately.

There is a lateral channel 80 connecting channels 50 and 60, also having 2.5 meters in depth and the ends of lateral channel 80 is substantially adjacent to reservoirs 20 and 30. At the inland end of the benthonic section 70 and channels 50 and 60 there is a barrier member 90 that extends from wall 15 in channels 50 to wall 15 in channel 60 and it has an opening 92 substantially in the center. The sub-area defined by barrier member 90 and retaining wall 15 is denominated nursing area 100 which is where the larvae are deposited. Pointed stacks 102 are burried in the berth of section 100 and protrude upwardly above the water level. They are positioned close to each other to prevent birds from coming close to the young shrimp. Also, barrier member 90 prevents any adult shrimp from entering nursing area 100 and rising the elimination of the larvae by this predator.

A fishing area 110, adjacent to salt water reservoir 20 functioning as biological filter 24, is located adjacent to lateral wall 114 and retaining wall 15. Fishing net 112 is positioned to coincide with the stream of salt water being directed through tubular member 25 that attracts the adult shrimp to be fished.

Several mating tanks 120 are disposed, preferably, in the proximity of fishing area 110. It is also possible to position these mating adults at any desired location. Mating adults are fished and the best ones selected from fishing area 110 and placed in tanks 120. The salinity of tanks 120 is regulated through pipes 126 and 136 from the high and low salinity reservoirs 20 and 30, respectively. After mating, the male shrimp are removed and, subsequently, after all eggs are laid, the female shrimp are also removed to prevent the loss of the newly born larvae. The larvae then is transported to nursing area 100 for further development. At this point during the larvae stage and the post larvae stage the growth continues in section 100 during which the shrimp feeds itself from the natural plankton and maintains a vertical position. Typically the larvae adheres to vertical stacks 102 where it maintains a vertical position until the larvae stage ends.

Then, when it is old enough to crawl out towards the marshy benthonic area 70 it goes through opening 92 seeking deeper waters and higher salinity levels. In nursing area 100 the larvae and young shrimp are protected from adult shrimp that may have come down lateral channel 50 because there is a barrier 90 which has mesh dimensions that are small enough to prevent an adult shrimp from area 70 to go through and to prevent young shrimps from area 100 to go through and force them to go to the higher salinity area through opening 92. The floor of nursing area 100 is covered with materials that create a horizontal biological filter. Stakes 102 are vertically positioned in nursing area 100 to protect the larvae from predators (birds) and also to provide the larvae with a structure to which they can adhere to and maintain a stable position (vertical position when young). Adult shrimp usually seek the deeper bottoms during the day and would normally stay within channel 50 to protect themselves from excessive solar radiations. Also, the adult shrimp tends to seek higher salinity water and it will crawl towards salt water reservoir 20 and away from the lower salinity waters that are more suitable for the larvae. Benthonic area 70 occupies approximately 80% of the impoundment.

This apparatus and process is designed to be continuous and self-sufficient to provide the necessary biological environment for farming a specific shrimp type efficiently.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense, except as set forth in the following appended claims.

What is claimed is:

1. An impoundment for farming shrimp larvae and shrimp continuously and of specific size and said impoundment located in the proximity of salt and fresh water sources, comprising:
   A. a retaining wall defining a substantially rectangular area with a channel adjacent to the inner side of said wall and a central portion having a bottom surface above the plane of a bottom surface of said channel, said central portion being substantially surrounded by said channel;
   B. first reservoir means for storing salt water located in a corner location of said rectangular area in close proximity to said salt water source and at the end of said channel and said first reservoir means including means for discharging the salt water contained therein into said rectangular area and said means for discharging the salt water further including an outlet;
   C. first pumping means for pumping the salt water from said salt water source into said first reservoir means;
   D. second reservoir means for storing fresh water located in a corner location of said rectangular area in close proximity to said fresh water source and opposite to said first reservoir means;
   E. second pumping means for pumping the fresh water from said fresh water source into said second reservoir means;
   F. barrier means for dividing said rectangular area so that first and second sub-areas are defined and said first sub-area being farther away from said first and second reservoir means than said second sub-area, and said barrier means having an opening of relatively small dimensions with respect to said barrier means so that shrimp from said second sub-area is prevented from swimming into said first sub-area;
G. fishing net means positioned between said first reservoir means and said rectangular area so that the shrimps that are attracted towards the higher salinity areas can be captured with said fishing net means; and
H. a plurality of means for draining the water inside said retangular area to permit the regulation of currents, salinity, temperature, oxygen content, transparency, and hydrography of said impoundment.

2. The impoundment set forth in claim 1 wherein said first and second reservoir means includes each at least one wall that is shared with said rectangular area and said wall functions as a vertical biological filter.

3. The impoundment set forth in claim 2 wherein the bottom surfaces of said channel and said central portion include a horizontal biological filter and said central portion includes a benthonic bottom.

4. The impoundment set forth in claim 3 wherein said walls in said first and second reservoir means includes means for directing a stream of water into said rectangular area.

5. The impoundment set forth in claim 4 wherein said fishing net means are cooperatively positioned with respect to said means for directing a stream of water in order to attract the shrimp intended to be fished.

6. The impoundment set forth in claim 5 wherein said first sub-area includes a plurality of vertical members to protect the shrimp larvae contained therein and also to provide them with vertical support.

7. The impoundment set forth in claim 6 further including;
I. mating tanks for the continuous production of said shrimp larvae from adult shrimp selectively fished by said fishing net means.

* * * * *